Patented Aug. 30, 1932

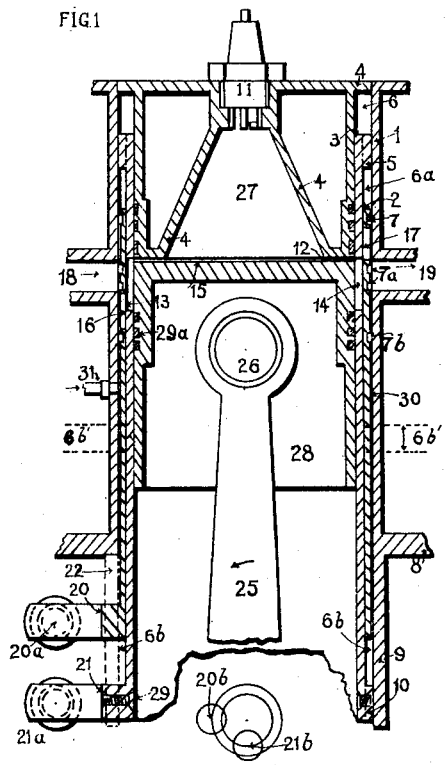

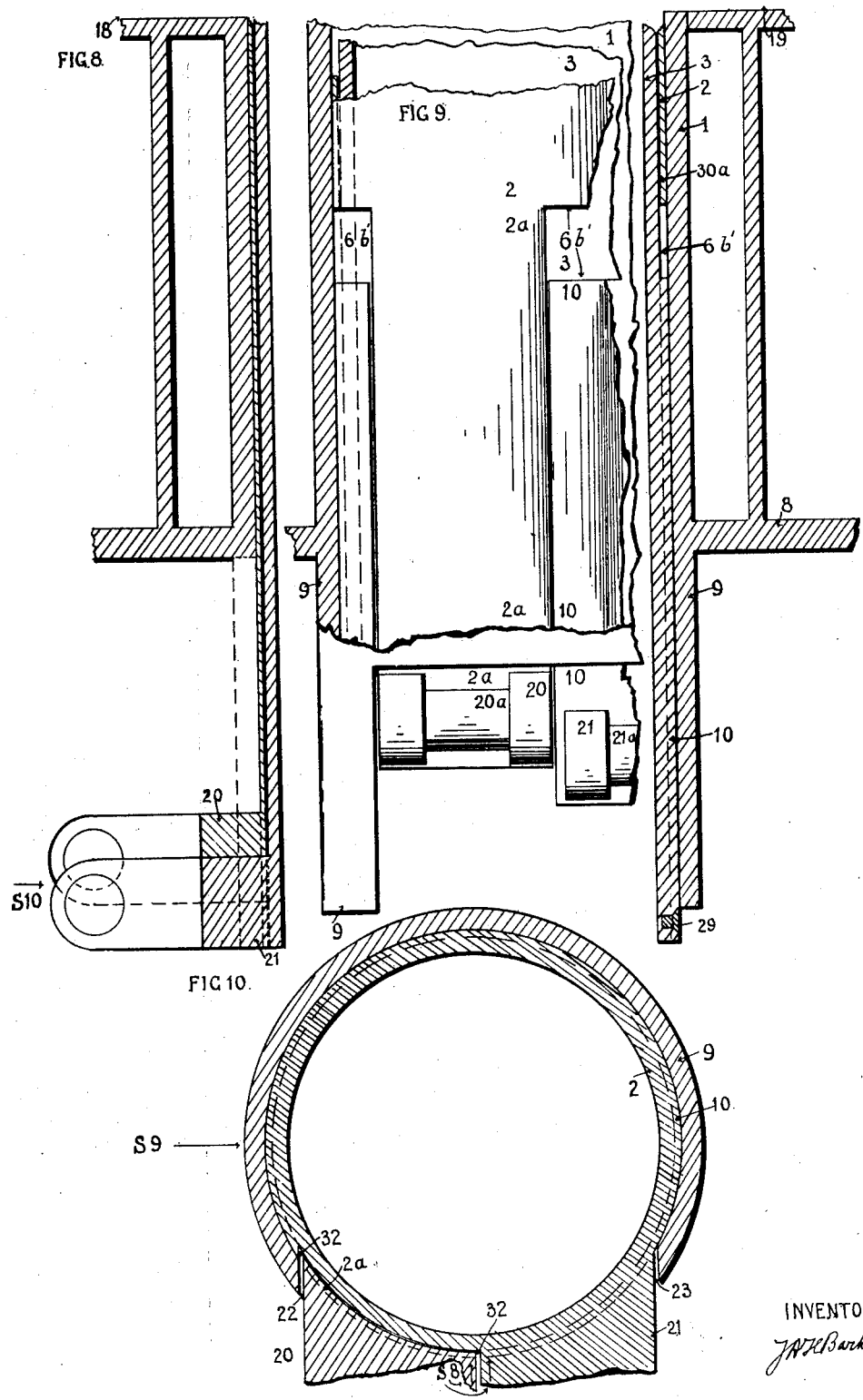

1,874,223

UNITED STATES PATENT OFFICE

JEAN A. H. BARKEIJ, OF ALTADENA, CALIFORNIA

SLEEVE-VALVE INTERNAL COMBUSTION ENGINE

Application filed February 19, 1927, Serial No. 169,508. Renewed May 10, 1932.

The primary object of my invention is to eliminate the seizing or cramping of the sleeves between the piston and cylinder wall by the lateral thrust of the piston due to the explosive pressure as is fully explained in the Patent No. 1,072,860 Sept. 9, 1913 to Ch. Y. Knight.

The present invention is designed to overcome this disadvantage by providing the outer sleeve with a thrust extension at the upper and lower end or by providing a shoulder on the inside of the top and bottom end of the cylinder to secure a sliding surface for the top and bottom end of the inner sleeve.

The inner sleeve and head can thus be released from all thrust and both sleeves are released from any reciprocal friction due to the difference in speed of the sleeves.

Fig. 1 is a cross-sectional view of a sleeve valve engine in which the inner sleeve is provided with extensions. Fig. 2 shows the same engine in which the cylinder is provided with the thrust surfaces for the inner sleeve. Fig. 3 shows a section of Fig. 1 on the level of the lug 20 of the outer sleeve of Fig. 1 and Fig. 2. Fig. 4 shows a section of Fig. 1 on the level of the lug 21 of the inner sleeve of Fig. 1. Fig. 5 shows a section of Fig. 2 on the level of the lug 21 of the inner sleeve of Fig. 2. Fig. 6 shows the recesses in the extension 9 of the cylinder 1 and the position of the stationary annular ring 10a as shown in Fig. 2. Fig. 7 shows the bridges in the ports of the cylinder wall. Figs. 8, 9, 10 are a modification.

In Fig. 1, 1 is the cylinder, 2 the outer sleeve, 3 the inner sleeve, 4 the reentrant head, 5 is the annular extension on the top of the inner sleeve, 6 the space above it, 6a the space below, and thrust surface 10. 7 is a compression ring above the ports in the outer sleeve, 7a rings between those ports, 7b below those ports, 8 is the flange of the cylinder to be attached to the crank case (or forming a part thereof) 9 is an extension protruding into the crank case and not being subjected to the longitudinal stresses of the cylinder 1 above the flange 8. 10 is the annular ring attached to the bottom end of the inner sleeve and might form a solid part with the lug 21. 11 is ignition means, 12 is the annular space between the lower end of the head 4 and the top-end of the piston 15 in its highest position. 13 is the inlet port and 14 the exhaust port in the inner sleeve, 16 is the inlet port below and opposite the exhaust port 17 in the outer sleeve. 18 and 19 are the inlet and exhaust port in the cylinder, 20 is the lug on the outer sleeve affording means of attachment to the well known excentric mechanism for operating it, 21 is the lug for the inner sleeve, 22 is the recess in the cylinder extension 9 for the lug 20, 23 is a recess of smaller depth for the lug 21 as can be better seen in their relative position from Fig. 6. 20a and 20b are the wrist pin and crank pin for the lug 20, 21a and 21b those for the lug 21, 24 is the part of the extension 9 between the recesses 22 and 23. 25 is the connecting rod, 26 the wrist pin for the working piston 15, 27 the explosion space in the head 4 above the center of the piston 15, 28 the expansion space. Screws 29 are the means which attach the lower and upper annular ring to the inner sleeve, though one of these might be made inherent with the sleeve. One of the annular rings can be welded to the inner sleeve after the outer sleeve is telescoped thereover. Both might be made integral with the inner sleeve if the outer sleeve is cut in two, placed around the inner sleeve, and afterwards welded.

In Fig. 2 the same numbers represent the same parts. The annular extensions 5a and 10a are here however attached to the cylinder instead of to the inner sleeve.

Fig. 3 shows the extension 9 with the recess 22 for the lug 20, the outer sleeve 2, the inner sleeve 3, the space 30 between the cylinder and outer sleeve, and the space 30a (Fig. 2) between the sleeves. These spaces are here represented by a single line.

In Fig. 4 the extension 9 with the recess 22 and the recess 23 for the lug 21 is shown and the part 24, the inner sleeve 3 with the annular ring 10 (which might be constructed as a solid part of the lug 21 and then attached to the sleeve, or might be constructed as a separate part welded or attached by screws to the inner sleeve as shown).

Fig. 5 shows the extension 9 with the recesses 22 and 23, the annular ring 10a attached to this extension and providing the same recess 23 for the lug 21.

Fig. 6 shows a side view of the recesses 22 and 23, 23a in the extension 9 and the part 24 of this extension.

Fig. 7 shows the bridges in the ports of the cylinder wall.

Figs. 8, 9, 10 show sectional views of a modification of Figs. 1 and 2 and the same numbers represents the same parts. 2a is an extension of the outer sleeve 2 and the lug 20 is attached to this lip. The annular ring 10 or 10a which can again be attached to the sleeve or to the cylinder is provided with a partial recess 32.

In Fig. 1 the inner sleeve receives the thrust from the piston due to the oblique connecting rod and transmits this thrust not to the outer sleeve but to the cylinder by means of the annular rings 5 and 10 which have a little greater outside diameter than the outside diameter of the inner sleeve. As in a practical arrangement of the ports of the sleeve and the respective eccentrics as shown in Fig. 1 connected with the lugs 20 and 21, there is a cooperation of the edges of the exhaust and (inlet) ports in the outer sleeve with the edges of the exhaust and (inlet) ports in the cylinder wall, the outer sleeve is provided with rings above the inlet port and rings between the exhaust and inlet port and below the exhaust port for reasons of sealing and oil pumping. The outer diameter of the outer sleeve is so much less than the inner diameter of the cylinder as to prevent any seizure of the outer sleeve between the inner sleeve and the cylinder wall. These rings can be of the expansion type or split rings welded after they are put in place. The amount of bending of the inner sleeve due to the maximum lateral thrust will result in such a small deflection, that the decrease of the diameter of the outer sleeve has to be very little, as is shown greatly exaggerated in the drawings. This lateral thrust should be taken up by an adequate surface of the annular rings 5 and 10, which should be about equal to the surface of the piston. The friction will wear out the piston surface quicker than this surface, having smaller reciprocation, better lubrication, better cooling.

In Fig. 2 the same principles are applied with a slight modification. The thrust surfaces are on the top and bottom end of the cylinder and the surfaces increase and decrease according to the position of the sleeve. In the construction of Fig. 1 the thrust surface is constant. When the piston is in top position ready for explosion, the inner sleeve is approximately in its top position and the top thrust surface is a maximum near the point where the pressure is greater.

In Fig. 1 the lower end of the outer sleeve has to remain in any position above the movable annular ring 10 and in Fig. 2 this end has equally to remain above the stationary annular ring 10a. In Fig. 2 the inner sleeve is slightly longer to provide sufficient thrust surface when the inner sleeve is in its top position. In Fig. 2 the inner diameter of the outer sleeve is a little larger than that of the outer diameter of the inner sleeve and the rings 7c and 7d can be placed on the outside of the inner sleeve on both sides of the ports which are practically on the same level. The advantage of this construction is, that the unequal expansion of the sleeves, on account of the different amount of heat received and dispensed by the two sleeves, will not affect the friction between the two sleeves and the space 30a will prevent any seizure. Metals with different and same expansion coefficient and different specific weight can be used without complication. Steel sleeves can be used without a coating of white metal on the inner or outer sleeve. The oil from the oil lead 31 should have access through the holes 31a in the outer sleeve. However the space 30 and 30a on both sides of the outer sleeve can be used and both sleeves should be provided by packing members on the outside or inside.

It is understood that the decrease of friction between the piston and the cylinder wall (said cylinder having a single diameter throughout) can be equally decreased by providing not only the inner sleeve with two thrust surfaces at the upper and lower end thereof, but also the inner sleeve. The two thrust surfaces of the inner sleeve should slide in that case upon the inner diameter of the outer sleeve, and the two thrust surfaces of the outer sleeve on the single diameter bore of the cylinder. The total friction surface is equally here decreased to a minimum, but slightly greater than that of the arrangement of Figs. 1 and 2, and the outer sleeve may be pinched between the piston and the inner sleeve, though the surface of pinching will be greatly decreased, like that in Figs. 1 and 2, where it is practically eliminated, except for the oil rings in the inner and outer sleeve. In this latter arrangement oil may be fed also through pipe 31, and oil holes 31a in the outer sleeve, between the inner and outer sleeve. It is preferred to introduce said oil on the exhaust side as shown in Fig. 2. It is further especially preferred to make the oil holes 31a in the inner sleeve only at the exhaust side of the cylinder and sleeves. During the inlet period there exists a partial vacuum around the inlet ports, tending to suck the oil through the ports 16, and 13, into the combustion chamber 27, causing too much carbon therein. In both constructions of Fig. 1 and Fig. 2 the head is released from all thrust and compression rings in multiple instead of the usual junkring will be more efficient here and the small rings will not break so easily. In the construction of Fig. 1 the exhaust and inlet ports in the cylinder wall should be provided with bridges to prevent the rings from catching in the ports. If these rings are placed on the inner sleeve only as in Fig. 2 the bridges have to be transferred to the ports in the outer sleeve. The ports in the inner sleeve should have bridges also on account of the position of the piston. Those bridges should coincide with those of the outer sleeve in radial planes from the axes of the cylinder.

It is understood that the same construction can be applied on engines with a single sleeve or with more than two sleeves to decrease the friction in general. The rings above and below the port can also be incorporated.

The construction is equally applicable where said sleeve is subjected also to longitudinal stresses as shown in my Patent No. 1,595,372.

It is further understood that one annular ring can be made integral to the upper end of the cylinder wall as shown in Fig. 2 and the other to the crank shaft end of the inner sleeve as shown in Fig. 1. This construction has the great advantage that the annular ring can be respectively made integral with the cylinder and sleeve, the outer sleeve can be slipped over the inner, and the annular rings can be made solid with cylinder and sleeve without welding. The reverse of this construction has not the same advantage, the lug and annular ring of the inner sleeve is made detachable. It is further understood that the lower thrust surface can be enlarged to about half way the water cooled surface of the cylinder and a recess can be made in the annular ring 10 of the inner sleeve for the arm, in the form of an arc, of the outer sleeve which would have then, comparatively, a cylindrical body much shorter than that shown in Fig. 1. The relative position of the lug 20 attached to this outer sleeve will look similar to Fig. 3 indicated by the dotted lines 32, and this lug 20 will reciprocate equally in the recess 22 of the extension 9 and the annular ring 10 or 10a but does not need to stay above the lug 21 which can be attached to the broad annular ring 10 which extends half way the water-cooled cylinder wall. The space 6b is transferred to a higher location, 6b' as shown in Figs. 8, 9 and a lip 2a extends downwards in an arc cut away from the annular ring 10 or 10a to provide means to attach the lug 20, as is sufficiently shown in Fig. 10. In Figs. 8–10 again are possible two constructions with respect to the thrust surfaces and spaces. The inner surface of the outer sleeve can be made fitting snugly the outer surface of the inner sleeve. The outer surface of the upper part of this sleeve can be machined smaller than the diameter of the cylinder bore, the lower part keeps the diameter of the cylinder bore and can be cut off, except for the lip 2a with the lug 20, and the other part 10 with the lug 21 can be attached to the inner sleeve as a thrust surface 10. The lip 2a has to be decreased on the outside surface to the diameter of the upper part to prevent seizure. The outer surface of the outer sleeve can be made however equal to the cylinder bore and the inner surface decreased with respect to the outer surface of the inner sleeve. The inner surface of the lower part has to fit exactly the outer surface of the inner sleeve, like in the first construction, in fact the outer sleeve can be shrunk upon the inner sleeve so far as this part 10 is concerned. The lip 2a has now to be decreased on the inside to prevent seizure. In both cases can the lugs 20 and 21 be made solid with the outer sleeve. The lug 21 is later transplanted on the inner sleeve in any way in which the annular part 10 can be attached to the inner sleeve. If this part 10 as 10a will be attached to the cylinder as shown in Fig. 2, then the lug should be made integral with the respective sleeves, and the part 10a should be provided with a recess 23a as shown in Fig. 6, which extends as far as recess 23. The space 6b' is a disadvantage from a cooling standpoint, but the single sleeve below this space will favor heat conduction from within, there being only two layers of oil.

The oiling of the outer sleeve can be done from the top or from the side as shown in Fig. 2.

The thrust surface can be of course incorporated at the top end of the cylinder as shown in Figs. 1 and 2. Like for the Figures 1 and 2 the spaces 30 and 30a may be applied on both sides of the surfaces of the outer sleeve and eventually provided with compression and oil rings.

A single recess 22 can be made to prevent a weakening of the extension 9 on account of the two recesses 22, 23 and to allow lugs of ample width; the inner sleeve can be prolonged and the lug 21 lowered so that this lug 21 moves below the extension 9 as shown in Fig. 3 and the annular ring 10 will move inside the extension as shown in Figs. 1, 3 or will be attached to the inside of the extension as shown in Figs. 2 and 6. The inner sleeve in this case can be provided with a recess for the connecting rod of the working piston.

A variation of this construction with two recesses however, but stiffer, can be made so that the annular ring will cover the lower part of the recess 22 as shown in Fig. 6 and can be cut away for the recess 23a to prevent a lengthening of the inner sleeve as mentioned above. The lug 20 cannot pass below the upper part of the annular ring 10a which is now stationary as shown in Fig. 2. The lug 21 moves now in a recess 23 of the extension 9 and 23a of the annular ring 10a.

The thrust from the piston during the explosion stroke should be in general away from that side where the recesses are in the extension 9, thrust surface 10 or 10a.

I claim:

1. Internal combustion engine in combination, a cylinder with an extension protruding into the crank case, a reentrant head, a working piston, a sleeve between said head, piston and said cylinder, provided with a horizontal annular extension at the top and bottom end, of a diameter greater than the middle part of said sleeve, said annular extension having a diameter equal to the cylinder bore.

2. Internal combustion engine in combination a cylinder, a reentrant head, a reciprocating piston, two concentric sleeves between said cylinder and said head and piston, annular thrust surfaces between the outer surface of the inner sleeve and inner surface of said cylinder, said thrust surfaces of such a diameter, that the outer sleeve cannot be seized between the inner sleeve and the cylinder wall.

3. A structure as set forth in claim 2 in which said thrust surfaces are respectively attached to the top end of the cylinder and the bottom end of the sleeve.

4. An internal combustion engine comprising a cylinder, a reentrant head, two concentric sleeve valves between said cylinder and said head, a piston reciprocating in the inner one of said sleeves, an annular thrust surface between the outersurface of the inner sleeve and the inner surface of said cylinder, said thrust surface located at the lower end of said cylinder and inner sleeve, said surface of such a diameter that the outer sleeve cannot be seized between the inner sleeve and said cylinder at the lower end thereof, where said sleeve is driven by a mechanism reciprocating said sleeve in timed relation with said piston.

5. An internal combustion engine comprising a cylinder, two concentric sleeves in said cylinder, a reentrant head and reciprocating piston in the inner one of said sleeves, an annular thrust surface between the outer surface of said inner sleeve and the inner surface of said cylinder, said thrust surface located at the upper end of said cylinder and inner sleeve, said surface of such a diameter that the outer sleeve cannot be seized between the inner sleeve and said cylinder at the top end thereof, said surface transferring the piston pressure directly from the inner sleeve to the cylinder wall instead of to the outer surface of said reentrant head.

6. An internal combustion engine, comprising a cylinder, two concentric sleeve valves in said cylinder, a reentrant head and reciprocating piston within the inner one of said sleeves, an annular thrust surface attached to the lower end of said inner sleeve, said surface of such a diameter that the outer sleeve cannot be pinched between said inner sleeve and cylinderwall by the piston on the explosion stroke at the lower end of said cylinder.

7. An internal combustion engine, comprising a cylinder, two concentric sleeve valves in said cylinder, a reentrant head and reciprocating piston inside the inner one of said sleeves, an annular thrust surface attached to the upper end of said inner sleeve, said surface of such a diameter that the outer sleeve cannot be pinched between said inner sleeve and cylinderwall by the piston on its explosion stroke at the upper end of said cylinder, thereby freeing also said reentrant head from any pressure transferred from said piston to said inner sleeve and from said inner sleeve to said reentrant head.

8. In a sleeve valve internal combustion engine, having a cylinder with an extension in the form of a sleeve protruding into the crankcase, two concentric sleeves inside said cylinder, a piston reciprocating in the inner one of said sleeves, said cylinder and sleeves provided with inlet ports opposite exhaust ports at the upper end thereof, at least one of said sleeves provided at the upper and lower end with thrust surfaces to decrease the friction between two adjacent cylindrical surfaces of said sleeves and cylinder.

J. A. H. BARKEIJ.